United States Patent
Fabrega-Sanchez et al.

(10) Patent No.: US 7,629,928 B2
(45) Date of Patent: Dec. 8, 2009

(54) PATCH ANTENNA WITH ELECTROMAGNETIC SHIELD COUNTERPOISE

(75) Inventors: Jorge Fabrega-Sanchez, San Diego, CA (US); Sidney Sitachitt, Carlsbad, CA (US); Andrew Stephen Poynot, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 623 days.

(21) Appl. No.: 11/087,171

(22) Filed: Mar. 23, 2005

(65) Prior Publication Data

US 2006/0214849 A1 Sep. 28, 2006

(51) Int. Cl.
*H01Q 1/38* (2006.01)
(52) U.S. Cl. ............................................. 343/700 MS
(58) Field of Classification Search .......... 343/700 MS, 343/702, 841
See application file for complete search history.

(56) References Cited

U.S. PATENT DOCUMENTS

| | | | | |
|---|---|---|---|---|
| 4,876,709 A | * | 10/1989 | Rogers et al. | 455/575.7 |
| 5,138,328 A | * | 8/1992 | Zibrik et al. | 343/702 |
| 5,635,942 A | | 6/1997 | Kushihi et al. | |
| 5,914,696 A | * | 6/1999 | Vanderhelm et al. | 343/841 |
| 6,140,975 A | * | 10/2000 | Cohen | 343/846 |
| 6,320,548 B1 | * | 11/2001 | Harrell et al. | 343/700 MS |
| 6,359,588 B1 | | 3/2002 | Kuntzsch | |
| 6,421,016 B1 | * | 7/2002 | Phillips et al. | 343/702 |
| 6,652,595 B1 | * | 11/2003 | Nicolo | 623/23.74 |
| 6,724,345 B2 | * | 4/2004 | Tran | 343/700 MS |
| 6,842,140 B2 | * | 1/2005 | Killen et al. | 343/700 MS |
| 6,879,287 B2 | * | 4/2005 | Popov et al. | 343/700 MS |
| 6,882,317 B2 | * | 4/2005 | Koskiniemi et al. | 343/700 MS |
| 7,042,398 B2 | * | 5/2006 | Tang et al. | 343/700 MS |
| 2002/0075190 A1 | * | 6/2002 | Ghosh et al. | 343/702 |
| 2004/0032371 A1 | * | 2/2004 | Mendolia et al. | 343/702 |
| 2005/0285794 A1 | * | 12/2005 | Tang et al. | 343/700 MS |
| 2007/0120748 A1 | * | 5/2007 | Jenwatanavet et al. | 343/702 |

FOREIGN PATENT DOCUMENTS

| | | |
|---|---|---|
| EP | 0878863 | 11/1998 |
| EP | 1398847 | 3/2004 |
| FR | 2627636 | 8/1989 |

* cited by examiner

*Primary Examiner*—Huedung Mancuso

(57) ABSTRACT

A patch antenna includes a radiating element positioned on one side of a printed circuit board and an electromagnetic shield positioned on the opposite side of the printed circuit board. The electromagnetic shield forms at least a portion of a counterpoise and is connected to the ground of the PCB in at least one location. Design flexibility in positioning the antenna within a portable communication device is maximized while the size of the portable communication device is minimized.

20 Claims, 2 Drawing Sheets

PATCH ANTENNA WITH ELECTROMAGNETIC SHIELD COUNTERPOISE

BACKGROUND

The invention relates in general to antennas and more specifically to a patch antenna having an electromagnetic shield counterpoise.

Electromagnetic signals are transmitted and received through antennas. The selection or design of an antenna for a particular device may depend on a variety of factors including signal frequencies, minimum antenna performance, and available space. In mobile wireless devices, the size and location of an antenna are important considerations for the performance of the antenna. Conventional mobile devices utilize embedded patch antennas such as a Planer Inverted "F" Antenna (PIFA) where a radiating element is positioned parallel to a ground plane formed by a conductive ground layer in a printed circuit board (PCB). The radiating element may be printed within a conductive layer in the PCB or may be formed on a separate component that is attached near the ground layer in the PCB. Conventional patch antenna designs are limited since the location of the ground plane in the PCB as well as other mechanical constraints of the mobile device design limits the potential location and position of the radiating element. Performance characteristics of the patch antenna such as bandwidth and efficiency are closely dependent on the spacing between the ground plane and the radiator element. As a result, the location and position of the PCB in conventional mobile devices limits the potential locations of the radiator element and often results in a larger mobile communication device than otherwise required.

Accordingly, there is need for a patch antenna that maximizes the flexibility in antenna location within a portable communication device and facilitates compact designs of mobile communication devices.

DETAILED DESCRIPTION

In accordance with an exemplary embodiment of the invention, a patch antenna includes a radiating element positioned on one planar side of a printed circuit board and an electromagnetic shield positioned on an opposite planar side of the printed circuit board. The electromagnetic shield forms at least a portion of the counterpoise of the antenna and is connected to the ground of the PCB in at least one location. The exemplary patch antenna apparatus maximizes the flexibility in antenna location within a mobile communication device while minimizing the size of the mobile communication device.

Figure 1:
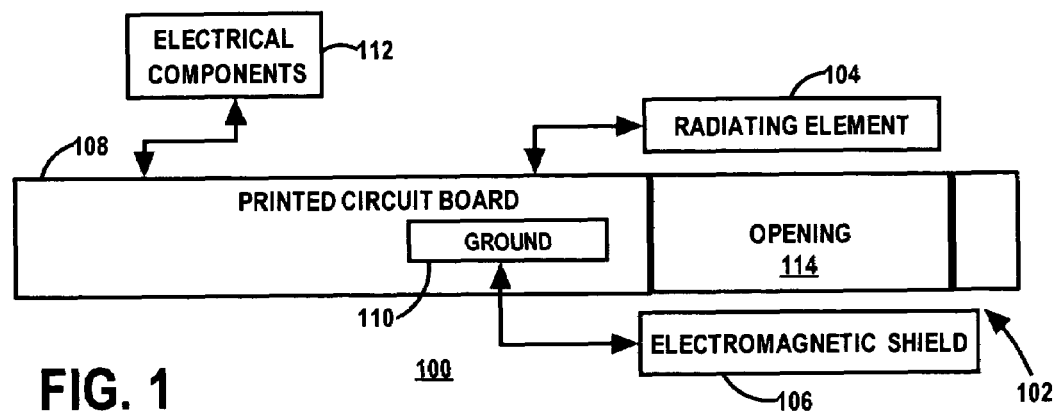
FIG. 1 is a block diagram of a patch antenna apparatus in accordance with an exemplary embodiment of the invention.

FIG. 1 is a block diagram of a side view of a patch antenna 102 within a mobile communication device assembly 100 in accordance with an exemplary embodiment of the invention. The blocks in FIG. 1 generally represent an exemplary relative configuration and do not necessarily represent relative sizes or positions of the components illustrated. The patch antenna 102 includes a radiating element 104 and a counterpoise at least partially formed by an electromagnetic shield 106. In the exemplary embodiment, the patch antenna 102 is integrated with a printed circuit board 108 of a mobile communication device such as, for example, a cellular telephone or wireless PDA. In some circumstances, however, the patch antenna 102 may be integrated with other devices or may be formed as a discrete component connectable to a mobile communication device. The patch antenna 102 is configured to operate in one or more frequency bandwidths. In the exemplary embodiment, the patch antenna 102 is a multi-band Planer Inverted "F" Antenna (PIFA) optimized to operate in the 824-894 MHZ frequency band (U.S. cellular), 1850-1990 MHZ frequency band (U.S. PCS) and the 1575 MHZ frequency band (GPS).

The radiating element 104 of the patch antenna 102 is positioned on one side of the printed circuit board (PCB) 108 and the electromagnetic shield 106 is positioned on an opposite side of the PCB 108. The electromagnetic shield 106 is connected to the ground 110 of the PCB 108 and forms at least a portion of the counterpoise (ground plane) for the patch antenna 102. In the exemplary embodiment, the counterpoise of the patch antenna 102 is formed by the combination of the electromagnetic shield 106 and the ground 110 of the PCB 108. The electromagnetic shield 106 may be formed from any of several electrically conductive materials and may have any of several shapes and sizes depending on the particular design constraints, operating frequencies, and desired performance. As discussed below in further detail, the dimensions of the electromagnetic shield 106 are selected, at least in part, in accordance with the desired position of the ground plane for the patch antenna 102.

As mentioned above, the electromagnetic shield 106 is connected to the ground 110 of the PCB 108. In the exemplary embodiment, at least a portion of the electromagnetic shield 106 is soldered to a ground layer in the PCB 108. The electromagnetic shield 106 may be connected using other techniques in some circumstances. For example, the electromagnetic shield 106 may be soldered to one or more ground vias as discussed below.

The radiating element 104 is any conductive strip, plate, sheet, or device suitable for radiating electromagnetic energy in operation with a counterpoise (ground plane) when appropriately excited with an electrical signal. As discussed below, the radiating element 104 in the exemplary embodiment is a discrete PIFA radiating element including a stamped element, a feed pin, a ground pin, and a support frame. In the exemplary embodiment, the frame of the discrete PIFA radiating element is secured to the PCB 108 with an attachment mechanism such as plastic clip arrangement. The radiating element 104, however, may be secured to the PCB 108 in a variety of ways depending on the particular type of radiating element design. For example, a radiating element 104 may be etched, or otherwise formed, into a conductive layer of the PCB 108. Also, the radiating element may be formed by more than one elements and/or parasitic elements in some circumstances. Where the radiating element 104 is a discrete radiating element, flexible tabs, pins, or other mechanisms suitable to connect the radiating element 104 to the PCB 108 may be used. In some circumstances, the radiating element 104 may be soldered to a copper trace or layer of the PCB 108. In the exemplary embodiment, feed and ground connectors electrically connect the radiating element feed and ground pins to the appropriate circuit connections of the mobile communication device assembly 100.

The mobile communication device assembly 100 includes electrical components 112 that are arranged and interconnected on the PCB 108 to form the circuits of the mobile communication device. The patch antenna 102 is connected to one or more of the circuits through copper traces, wires, electrical components, or connectors. Copper traces on the PCB 108 connect antenna circuitry to the connectors that engage the feed pin and ground pin of the radiating element 104.

In the exemplary embodiment, the PCB 108 includes an opening 114 between the radiating element 104 and the electromagnetic shield 106. In some circumstances, however, the area between the radiating element 104 and the electromagnetic shield 106 may at least partially include the dielectric material of the PCB 108. Accordingly, the radiating element 104 in the exemplary embodiment is positioned at least partially over a PCB opening 114 exposing at least a portion of the electromagnetic shield 106.

Figure 2:
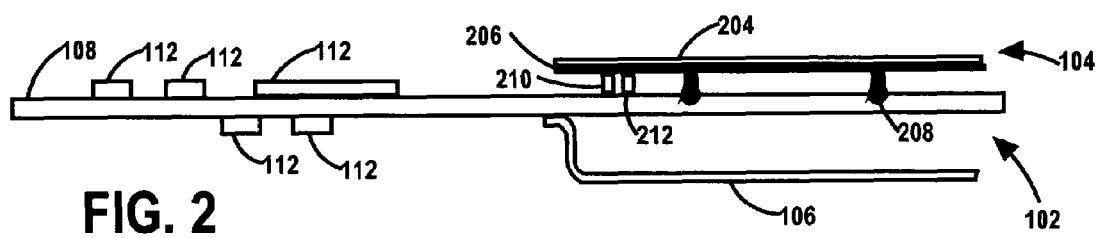
FIG. 2 is a mechanical schematic representation of a side view of the mobile communication device assembly in accordance with the exemplary embodiment of the invention.
Figure 3:
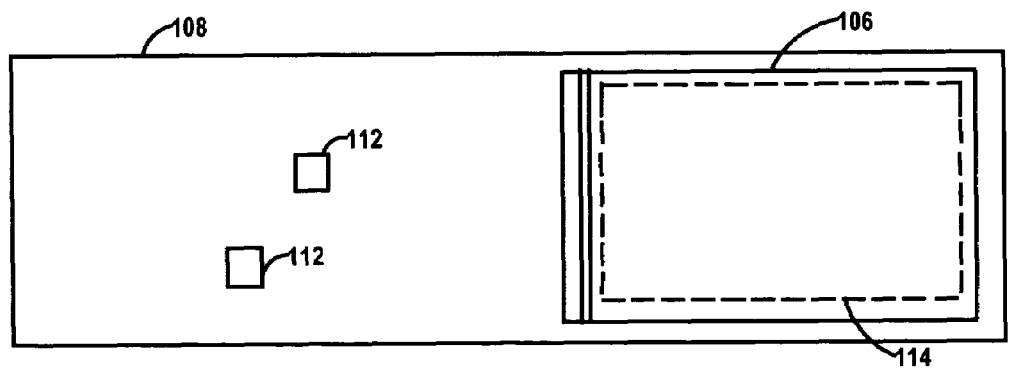
FIG. 3 is a mechanical schematic representation of a bottom view of the mobile communication device assembly in accordance with the exemplary embodiment of the invention.

FIG. 2 is a mechanical schematic representation of a side view and FIG. 3 is a mechanical schematic representation of a bottom view of the mobile communication device assembly 100 in accordance with the exemplary embodiment of the invention. In the interest of clarity, various details of the mobile communication device assembly 100 have been omitted in FIGS. 2 and 3. The components and elements represented by the general depictions in FIGS. 2 and 3 apply to any of several components or devices. For example, the circuit components are illustrated as rectangular blocks (112) in FIG. 2 and FIG. 3 although electrical components may have any of numerous shapes and sizes. Those skilled in the art will readily recognize the various components that are represented by the general depictions of the illustrations.

The radiating element 104 in the exemplary embodiment is a discrete device that includes a plastic frame 206 supporting a copper sheet 204 arranged in a pattern that creates a multi-band PIFA patch antenna 102 when positioned at the proper distance from a ground plane. As discussed above, however, the radiating element 204 may be any of several antenna design radiating elements and may be formed within a conductive layer of the PCB 108 in some circumstances.

The attachment mechanism 208 in the exemplary embodiment includes two or more plastic tabs that snap onto the PCB 108. A feed pin 210 engages a feed antenna connector on the PCB 108 that is connected to the antenna circuitry. A ground pin engages a ground connector connected to the ground 110 of the PCB 108.

The electromagnetic shield 106 is folded sheet of conductive material such as copper, steal, conductive plastics, plated plastic, or plastic with conductive paint. The selection of material and the manufacturing technique used to form the electromagnetic shield 106 depend on the particular implementation, cost considerations, and other factors. Examples of suitable structures of the electromagnetic shield 106 include structures that are adequately rigid to minimize deformations that result in antenna performance degradation. The exemplary electromagnetic shield 106 is formed from a 0.2 mm thick (38 gauge) sheet of cold rolled steel (1010-1008 series) using a sheet metal stamping process. An example of a suitable technique for shaping the electromagnetic shield 106 includes using a forming press. In the exemplary embodiment, the electromagnetic shield 106 is plated with tin to improve soldering characteristics. The height of the electromagnetic shield 106 is determined, at least in part, based on preferred separation between the radiating element 104 and a ground plane. The preferred separation is determined in accordance with known antenna design techniques as applied to the particular implementation of the patch antenna 102.

At least a portion of the electromagnetic shield 106 is connected to the ground 110 of the PCB 108. In the exemplary embodiment, a portion of one of four equilateral edges is soldered to a top conductive ground plane of the PCB 108. A suitable technique for soldering the electromagnetic shield 106 includes applying solder paste between the edge of the electromagnetic shield 106 and the PCB 108 and exposing the assembly in a reflow oven at the appropriate temperature. In the exemplary embodiment, the electromagnetic shield 106 includes one or more legs that have feet at right angles that are soldered to solder pads on the PCB 108. The feet are parallel to the PCB 108 and secured with solder paste to the solder pads allowing the electromagnetic shield 106 to remain positioned on the PCB 108 during the reflow soldering process. For additional structural integrity, more than one side of the electromagnetic shield 106 may be connected to the PCB 108. For example, at least portions of two sides, three sides, or all four sides of a rectangular shield may be soldered to ground 110. In some situations, soldering more than one side of the electromagnetic shield 106 to ground may degrade antenna performance. Further, other techniques may be used to electrically connect the electromagnetic shield 106 to the ground of the PCB 108. For example, the connection can be made using one or more conductive pillows or gaskets in some circumstances.

Figure 4:
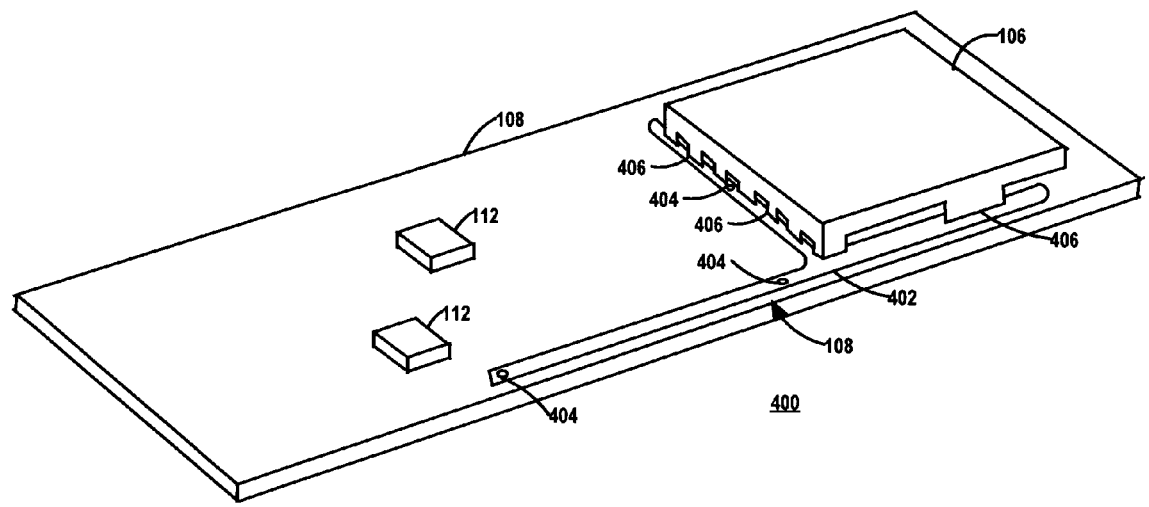
FIG. 4 is an illustration of a perspective view of an exemplary mobile communication device assembly where the electromagnetic shield is a rectangular metal shield.

FIG. 4 is an illustration of perspective view of an exemplary mobile communication device assembly 400 where the electromagnetic shield 106 is a rectangular metal shield. The exemplary electromagnetic shield 106 includes four equilateral sides where at least portions 406 of two of the sides are soldered to a ground 110 of the PCB 108. The ground 110 includes a conductive ground layer 402 that is formed on the side of the PCB 108 where the electromagnetic shield 106 is connected. Ground vias 404 connect other ground layers to the conductive ground layer 404. In some circumstances, the ground vias 404 may be eliminated. Further, the electromagnetic shield 106 may connected directly to ground vias 404 of the PCB ground 110. Although the exemplary electromagnetic shield 106 is rectangular, other shapes and configurations may be used where the shield 106 may have any number of sides and may be nonsymmetrical. For example, the shield 106 may be elliptical, circular, triangular, trapezoidal, or hexagonal and may have notches, grooves, indentation or other discontinuities on one more sides.

Therefore, the radiating element 104 and the electromagnetic shield 106 form a patch antenna 102 where the radiating element 104 is positioned on a first side of the PCB 108 and the electromagnetic shield 106 is attached to the opposite side. An opening 114 in the PCB 108 minimizes loss. Although a single side of the electromagnetic shield 106 may be connected to ground 110 of the PCB 108, multiple sides may be soldered to a conductive ground plane 402 in some circumstances. The electromagnetic shield 106 allows the ground plane of the exemplary antenna 102 to be offset from the plane of the PCB 108 or offset from the surface of the PCB 108. As compared to conventional antennas, additional flexibility is provided in positioning the patch antenna 102 relative to various components of a mobile communication device. For example, the thickness of a housing of a mobile communication device may be reduced since the patch antenna 102 may be centered within the housing.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A patch antenna comprising:
   a radiating element positioned on a first side of a printed circuit board; and
   an electromagnetic shield mounted on an opposite side of the printed circuit board to position the electromagnetic shield within a perimeter of the printed circuit board and forming at least a portion of a counterpoise of the patch antenna.

2. A patch antenna in accordance with claim 1, wherein the counterpoise of the antenna comprises the electromagnetic shield and a ground of the printed circuit board.

3. A patch antenna in accordance with claim 1, wherein the radiating element is positioned at least partially over an opening within the printed circuit board exposing at least a portion of the electromagnetic shield.

4. A patch antenna in accordance with 1, wherein the radiating element and the electromagnetic shield at least partially form a planar inverted "F" antenna (PIFA).

5. A patch antenna in accordance with claim 1, wherein the electromagnetic shield is soldered to a ground of the printed circuit board.

6. A patch antenna in accordance with claim 5, wherein the electromagnetic shield comprises four sides and is soldered to the ground along at least a portion of at least one of the sides.

7. A patch antenna in accordance with claim 6, wherein the electromagnetic shield is soldered to the ground along at least a portion of only one of the sides.

8. A patch antenna in accordance with claim 1, wherein the electromagnetic shield further comprises a top surface that is offset from the opposite surface of the printed circuit board.

9. A patch antenna comprising:
   a printed circuit board having a first side and a second side;
   a planar radiating element connected to the first side of the printed circuit board and positioned at least partially over an opening in the printed circuit board; and
   an electromagnetic shield connected to the second side of the printed circuit board and positioned at least partially under the opening and within a perimeter of the printed circuit board, the electromagnetic shield forming at least a portion of a counterpoise of the patch antenna.

10. A patch antenna in accordance with claim 9, wherein the electromagnetic shield comprises four sides and at least a portion of one side is soldered to a conductive ground layer of the printed circuit board.

11. A patch antenna in accordance with claim 10, wherein at least a portion of only one side is soldered to the conductive ground layer.

12. A patch antenna in accordance with claim 10, wherein at least a portion of at least two sides are soldered to the conductive ground layer.

13. A patch antenna in accordance with claim 12, wherein at least a portion of at least three sides are soldered to the conductive ground layer.

14. A patch antenna in accordance with claim 9, wherein the electromagnetic shield comprises a plurality of sides and a top surface that is offset from the opposite surface of the printed circuit board, each side connected between the top surface and the opposite surface of the printed circuit board.

15. A patch antenna in accordance with claim 9, wherein the radiating element and the electromagnetic shield at least partially form a planar inverted "F" antenna (PIFA).

16. A patch antenna in accordance with claim 15, wherein the PIFA is a multiband PIFA.

17. A patch antenna in accordance with claim 16, wherein the PIFA is optimized to operate in a frequency band of 824-894 MHZ, in a frequency band of 1850-1990 MHZ and a frequency band including 1575 MHZ.

18. A mobile communication device assembly comprising:
   a printed circuit board having a first side and a second side;
   a plurality of electrical components mounted to the printed circuit board;
   a planar radiating element connected to the first side of the printed circuit board and positioned at least partially over an opening in the printed circuit board; and
   an electromagnetic shield connected to the second side of the printed circuit board and positioned at least partially under the opening and within a perimeter of the printed circuit board, the planar radiating element and the electromagnetic shield forming at least a portion of a patch antenna.

19. A mobile communication device assembly in accordance with claim 18, wherein the electromagnetic shield comprises a top surface and four planar sides positioned between the top surface and the second side of the printed circuit board and at least a portion of an edge of one planar side is soldered to conductive ground layer of the printed circuit board.

20. A mobile communication device assembly in accordance with claim 19, wherein at least portions of each of at least two sides of the electromagnetic shield are soldered to the conductive ground layer.

* * * * *